United States Patent [19]

Wright

[11] 4,406,437
[45] Sep. 27, 1983

[54] KNOCK-DOWN SUPPORT BASE FOR MERCHANDISE DISPLAY RACK

[75] Inventor: Clem B. Wright, South Fulton, Tenn.

[73] Assignee: Waymatic, Inc., Fulton, Ky.

[21] Appl. No.: 343,746

[22] Filed: Jan. 29, 1982

[51] Int. Cl.³ .......................................... F16M 11/20
[52] U.S. Cl. .................................. 248/529; 248/188.7
[58] Field of Search .................... 248/529, 188.7, 158, 248/165, 159, 188.5, 157; 108/150; 403/219, 217; 52/165

[56] References Cited

U.S. PATENT DOCUMENTS

| 958,644 | 5/1910 | Huff | 248/529 |
|---|---|---|---|
| 1,762,545 | 6/1930 | Carpenter et al. | 248/165 |
| 2,554,887 | 5/1951 | Tricarico | 52/165 X |

FOREIGN PATENT DOCUMENTS 179286 8/1935 Switzerland ........................ 248/529

Primary Examiner—William E. Lyddane
Assistant Examiner—Sarah A. Lechok
Attorney, Agent, or Firm—B. P. Fishburne, Jr.

[57] ABSTRACT

A support base for merchandise display racks particularly of the revolving type knocks-down easily for compact shipment and storage without sacrifice of strength and durability when assembled for use. The parts fit together without the need for tools and only a single locking set screw requires tightening. A double telescoping sleeve arrangement imparts strength and stability to the support base. Manufacturing cost is minimal.

7 Claims, 5 Drawing Figures

U.S. Patent    Sep. 27, 1983    4,406,437
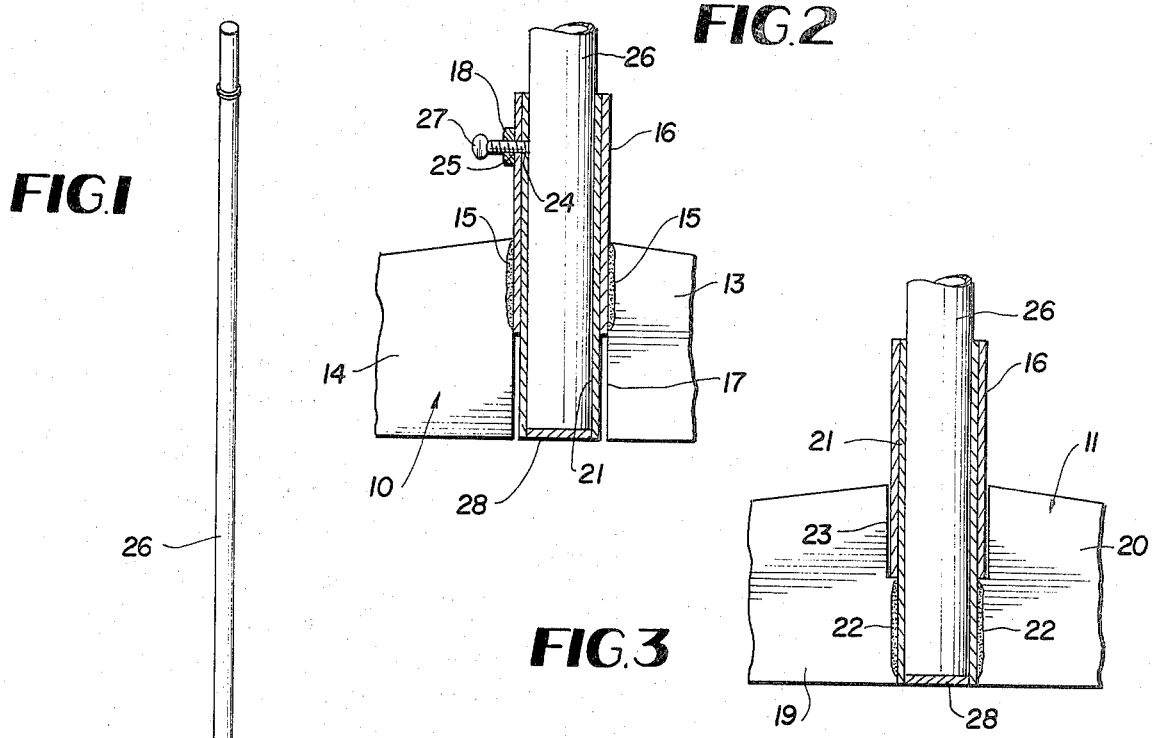
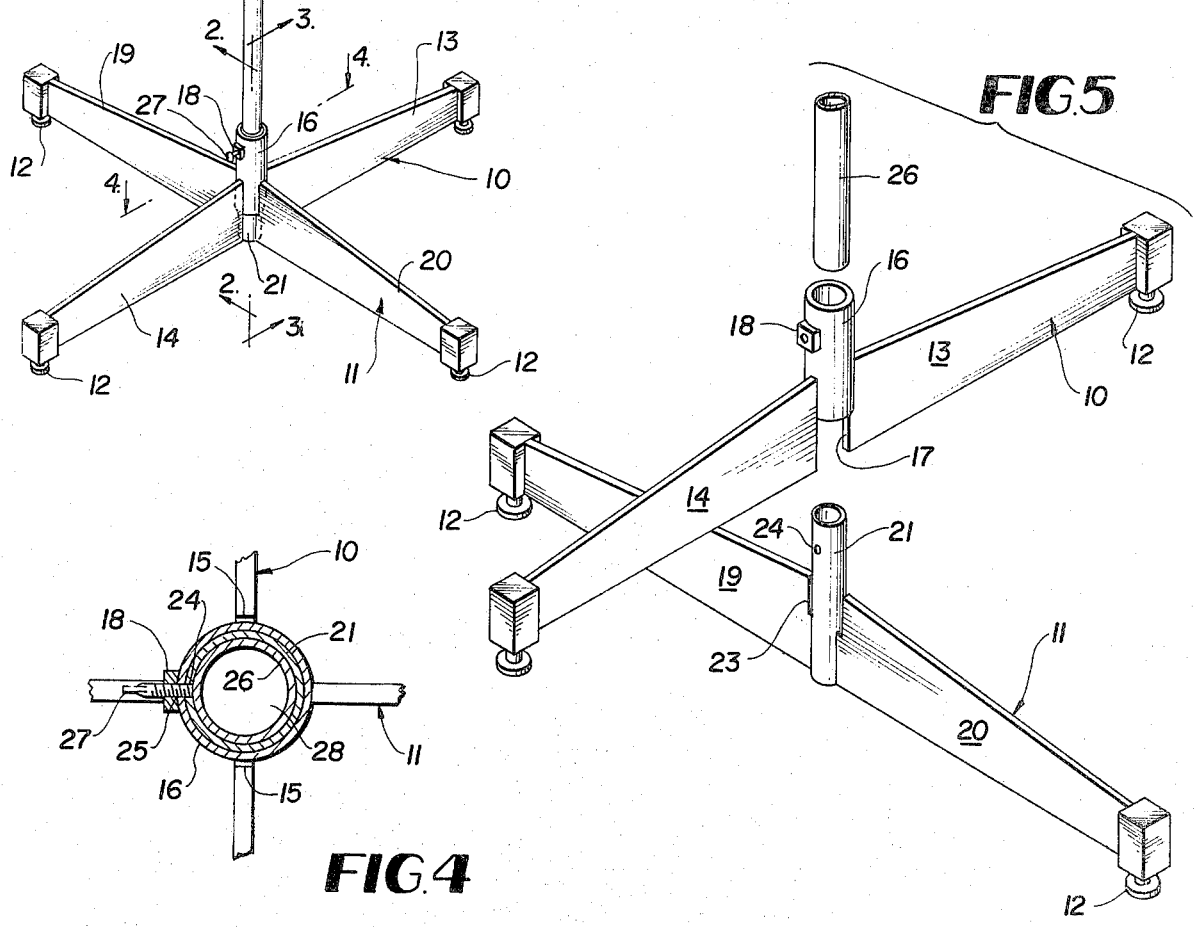

KNOCK-DOWN SUPPORT BASE FOR MERCHANDISE DISPLAY RACK

BACKGROUND OF THE INVENTION

The simple objective of this invention is to provide an improved knock-down supporting base structure for merchandise display racks in comparison to the known prior art.

It is highly desirable that such racks and their supporting bases be of a knock-down nature to facilitate compact storage and shipment. Ordinarily, the knock-down or separable design of such equipment results in a substantially weaker and less stable product after assembly for usage. This is not the case with the present invention. After assembling for heavy duty commercial usage, the present invention is extremely strong and very stable due to the unique interfitting component parts, particularly the telescoping engagement of two upright sleeves on the crossing base members with each other, and the reception in the interior sleeve of the vertical pole of the rack.

An objective of the invention is to provide a knock-down support base which can be manufactured economically on a comparative basis with competing products.

Other features and advantages of the invention will become apparent to those skilled in the art during the course of the following description.

BRIEF DESCRIPTION OF THE DRAWINGS

FIG. 1 is a perspective view of a knock-down support base according to the invention in the assembled state.

FIG. 2 is an enlarged fragmentary vertical section taken on line 2—2 of FIG. 1.

FIG. 3 is a similar section taken on line 3—3 of FIG. 1.

FIG. 4 is an enlarged fragmentary horizontal section taken on line 4—4 of FIG. 1.

FIG. 5 is an exploded perspective view of the support base.

DETAILED DESCRIPTION

Referring to the drawings in detail wherein like numerals designate like parts, a knock-down support base for a display rack comprises a pair of equal length elongated base sections 10 and 11 which are horizontally disposed in use and provided at their opposite ends with conventional adjustable leveling feet 12. The two base sections 10 and 11 are constructed of sturdy plate stock and, in use, the plate sections are disposed vertically for maximum rigidity.

The base section 10 comprises two plate sections 13 and 14 whose inner ends are welded as at 15 to the lower end portion of a relatively short vertical open ended sleeve 16 which extends substantially above the tops of the two plate sections 13 and 14. A gap or notch 17 is provided at the bottom of the sleeve 16 between the plate sections 13 and 14 of base section 10. A threaded nut 18 is welded to the exterior of sleeve 16 somewhat above the two plate sections 13 and 14.

Similarly, base section 11 comprises two plate sections 19 and 20 between which a second vertical sleeve 21 is disposed having its lower end portion welded as at 22 to the interior ends of plates 19 and 20. A clearance space or notch 23 is provided in the base section 11 on opposite sides of the sleeve 21 and above the welds 22 in order to accommodate the sleeve 16, FIG. 3, when the base is assembled. The sleeve 21 has a radial aperture 24 formed through its side wall above the plates 19 and 20 adapted for alignment with the threaded aperture of nut 18 and a registering aperture 25 in sleeve 16.

When the support base is assembled for use, the two base sections 10 are arranged in right angular crossing relationship, FIG. 5, with the two sleeves 16 and 21 in coaxial relationship. The larger diameter sleeve 16 is slipped over the projecting end portion of the smaller sleeve 21 telescopically with the bottom end of sleeve 16 seating solidly at the bottom of notch 23, as best shown in FIG. 3 of the drawings. This seating will place the nut aperture in registration with the two unthreaded apertures 24 and 25 of the two sleeves.

A vertical pole 26 forming a component of the rack structure and support base has its lower end engaged telescopically into the smaller sleeve 21 of the supporting base and, following this, a single locking thumb or set screw 27 is engaged with the nut 18 and tightened through the apertures 24 and 25 to contact pole 26 and lock it securely in the sleeve 21 at the selected height adjusted position.

Additionally, a support plug 28 or disc is welded into the lower end of the interior sleeve 21 so that the pole 26 can bottom and rest solidly on this disc before the set screw 27 is finally and firmly tightened. This adds to the security and stability of the base and eliminates the possibility of the lower end of the pole 26 from being inadequately supported or dropping into contact with the floor below the base.

When the set screw 27 is tightened into firm engagement with the pole 26, the pole and interior sleeve 21 are pushed solidly against the wall of the outer sleeve 16 diametrically opposite the set screw. This eliminates all looseness and wobble in the assembly and imparts to it the appearance and functional characteristics of a permanently assembled non-separable base.

No tools are required to assemble or quickly knock-down the support base. The welded construction and the telescoping interfitting of the two sleeves 16 and 21 and the rather long bearing surface provided for the pole 26 by the interior sleeve 21 which is longer than the sleeve 16 renders the assembled base very strong and stable. It should be noted that the longer sleeve 21 on base section 11 extends to the lower edges of the plates 19 and 20 to provide this increased bearing surface for the pole 26. Both sleeves 16 and 21 project equidistantly above the two sections 10 and 11 when the base is assembled.

The advantages of the device should now be fully apparent to those skilled in the art, and it is to be understood that various changes in the shape, size and arrangement of parts may be resorted to, without departing from the spirit of the invention or scope of the subjoined claims.

I claim:

1. A knock-down support base for a rack or the like comprising a pair of separable crossing elongated support base sections, a first upright axis sleeve rigidly secured to one of said base sections at its center, a second upright axis sleeve rigidly secured to the other support base section at its center and adapted to engage telescopically within the first sleeve, an upright axis pole engaging telescopically within the bore of the second sleeve, and a single clamping set screw means on the first sleeve in registration with an aperture of the second sleeve and engaging said pole within the second sleeve to force the pole and second sleeve solidly against the far side of the first sleeve to solidify the support base.

2. A knock-down support base as defined in claim 1, and a disc element fixed in the lower end of the second sleeve and adapted to bear the weight of said pole through contact with the lower end of said plate.

3. A knock-down support base as defined in claim 2, and the first and second sleeves being of unequal lengths and having their top ends projecting equidistantly above the tops of the support base sections when the support base is assembled, the second sleeve extending below the first sleeve and having its lower end substantially flush with the bottoms of the support base sections.

4. A knock-down support base as defined in claim 3, and each support base section being formed of two plate sections having one of said sleeves welded between the inner opposing ends of the plate sections, at least the support base section having said second sleeve welded thereto having a clearance space around the upper end portion of the second sleeve to accommodate the lower end portion of the first sleeve when the support base is assembled, the first sleeve having a larger diameter than the second sleeve.

5. A knock-down support base as defined in claim 4, and said set screw means on the first sleeve comprising a nut welded to the exterior of the first sleeve above the tops of the plate sections, the bore of said nut registering with apertures formed in the first and second sleeves and the apertures being in registration with respect to the vertical axis of the pole when the lower end of the pole is resting on said disc element.

6. A knock-down support base as defined in claim 5, and adjustable leveling feet on the opposite ends of the support base sections.

7. A knock-down support base as defined in claim 1, and adjustable leveling means on each of said support base sections.

* * * * *